United States Patent [19]

Lagostina

[11] 4,161,260
[45] Jul. 17, 1979

[54] COVER FOR PRESSURE POTS

[75] Inventor: Adriano Lagostina, Gravellona Toce, Italy

[73] Assignee: Stratoflat International Company, Schaan, Liechtenstein

[21] Appl. No.: 926,282

[22] Filed: Jul. 20, 1978

[30] Foreign Application Priority Data

Dec. 3, 1977 [IT] Italy ............................... 30539 A/77

[51] Int. Cl.² ............................................ B65D 45/00
[52] U.S. Cl. .................................. 220/316; 220/319
[58] Field of Search ............... 220/203, 206, 316, 319, 220/303

[56] References Cited

U.S. PATENT DOCUMENTS

| 3,032,229 | 5/1962 | Schoepe et al. | 220/319 X |
| 3,973,694 | 8/1976 | Tess | 220/206 |

Primary Examiner—George T. Hall
Attorney, Agent, or Firm—Bucknam and Archer

[57] ABSTRACT

A cover effective to be applied to pots, casseroles and similar kitchen containers is described, which is of such size and structural characteristics as to allow use as part of a "pressure pot." The cover comprises an outwardly projecting edge, a cup-like portion which is provided with a rim which extends downwardly to a level lower than said outwardly projecting edge; an essentially annular component, for instance a gasket, located about the rim and capable of contracting or shrinking. The annular component has preferably a segmented perimetral outline, alternately of smaller and larger diameter, the small diameter parts circumscribing, as the component is in the contracted condition, a circle having a diameter lesser than that defined by the projecting edge.

9 Claims, 11 Drawing Figures

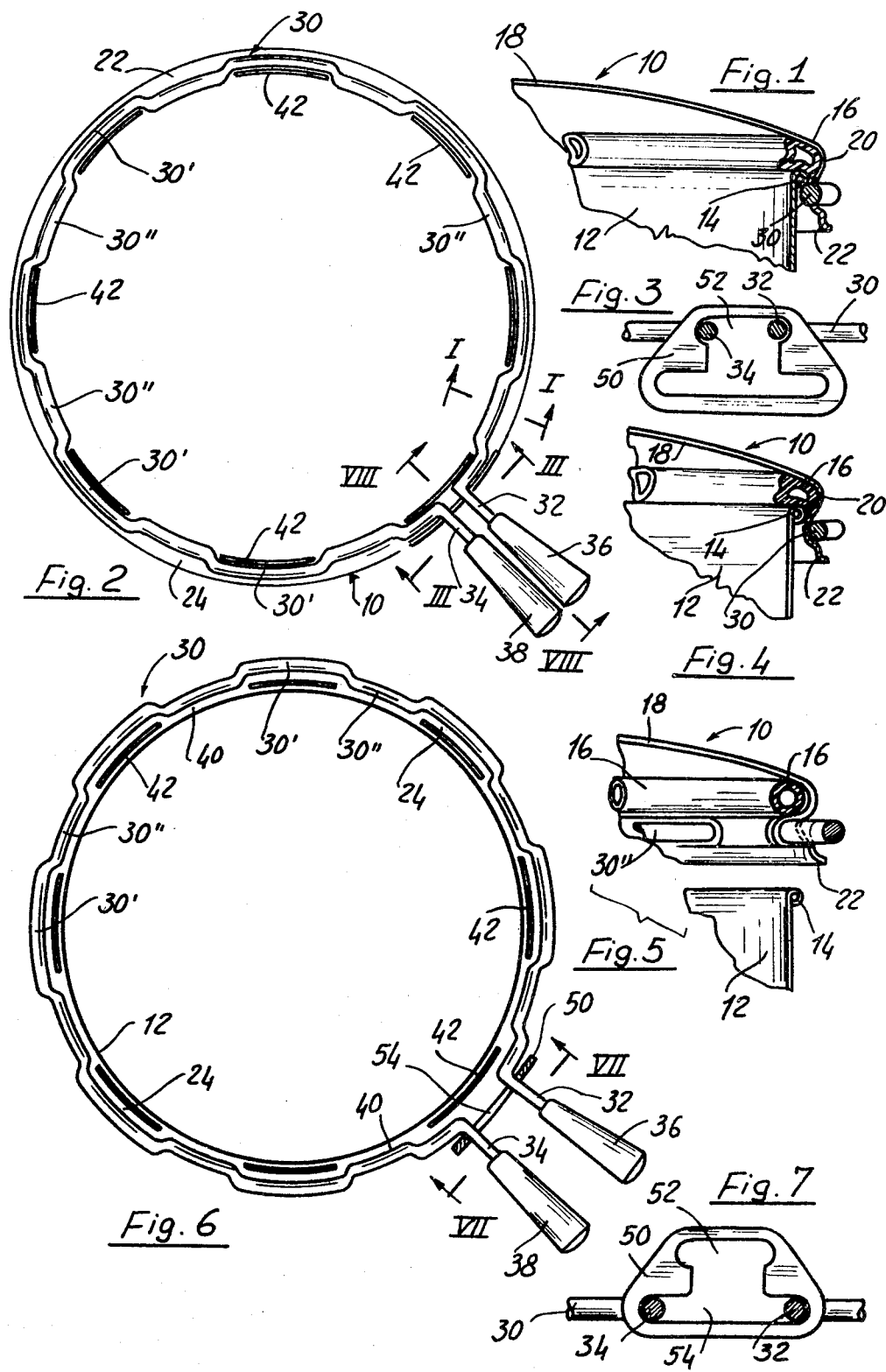

COVER FOR PRESSURE POTS

The present invention relates to means, effective to be associated to cooking containers in general, but not exclusively, made of a stainless stell plate, provided with an outwardly projecting rim, at the mouth thereof, such as pots, casseroles and the like, and with sufficient strength, height and capacity, to form the proper containing portion of a "pressure pot", said means being characterized by being provided with components effective to allow said means to be applied, as a cover, to a container of this type, in order to transform said container into an effective "pressure pot" adapted to be used as such under the most rational and favourable conditions.

The so called "pressure pots" are well known and widely diffused and used. Due to this fact it is deemed unnecessary any specific description of the structure and technical and service advantages thereof in the kitchen field. However, with respect to the present invention, it is simply pointed out the fact that each complete pressure pot, as industrially produced, marketed and used, is formed by two essential components, i.e. the very container or "pot" and the related cover.

Actually said pressure pots are produced and marketed by combining the two said essential components which are made and sized, particularly with respect to the complementary part thereof to be associated and connected for closing the pot, in an univocal way. In other words, the cover of a given pot (i.e. of a given maker and given size) may be associated only and exclusively to a given container, of that same maker, of the same type and size, at least with respect to the component parts thereof forming the mouth.

Due to the aforesaid univocal complementarity of said two components, a pressure pot is generally, from the assembly point of view, a product of great production and selling cost.

It is also known that the conventional cooking containers, at least those of greater value, which are preferably (but not necessarily) made of a stainless stell sheet, comprise, at the outline of the mouth thereof, an outwardly projecting rim, said rim being of even cross-section and preferably rounded. Frequently said rim forms only a small toroidal projection circumscribing the entire outline of the container mouth. It is generally obtained by beding, edging and other technological methods starting from the sheet of the walls of the container itself.

A plurality of kitchen and cooking containers, of some minimum depth with respect to the size, would perfectly perform, due to the capacity and mechanical strength characteristics thereof, as the container-component part of a pressure pot. In particular, considering that the pots, casseroles and like containers are industrially produced by series making methods, there are produced (or might be easily produced without deteriorating the technical and economical characteristics thereof) pots, casseroles and the like which, in the several ranges of diameter size, are able to meet strict or at least rather strict size and geometrical parameters, with respect to the mouth. In other words, in general, and at least with respect the individual makers or a plurality of makers, a given mouth-diameter pot or casserole is able to indifferently be associated to any cover, provided that it is of suitable or corresponding diameter.

In the light of the preceding description, it is an object of the present invention to provide such a cover, which will be therein below described and characterized, effective to be complementary associated to any known container or pot, said cover being provided with the aforesaid capacity and mechanical strength characteristics, to form the "container" of a pressure pot, in such a manner as to momentarily predispose said known container for a service as an efficient "pressure pot".

Accordingly, the cover according to the present invention may be properly defined (and in this manner it will be thereinafter defined, by the term "pressure cover".

The pressure cover according to the present invention is characterized in that it comprises a covering body (in general made of a metal and of cup-shape) and including a bent and downwardly directed perimetral edge or rim, of such a size to be fitted, in an essentially free way but within rather strict tollerance limits, on and about the rised or perimetral projection provided mouth of a cooking container of compatible diameter size and characteristics, and essentially annular element sized in such a way as to circumscribe said perimetral edge or rim of said body, at a level just under the container mouth projection and effective to contract, in particular resiliently contract, in such a manner that the perimetral development of the inner outline thereof, preferably at a plurality of the segments thereof distributed all along said outline, is able to become lesser than that of the outer outline of said container mouth projection, thereby forming a cut-away portion effective to contrast the rising and removing of the applied cover.

Said pressure cover is associated to means effective to assure a tight coupling of the cover itself and the container mouth, in particular to an annular gasket made of a deformable material, to means for firmly connecting said essentially annular element in the contracted condition thereof retaining the cover on said container, while allowing a disengaging at will to make void said retaining, and to suitable valve and safety means effective to release the superatmospheric pressures building up and maintaining in the thus formed pressure pot, during the use thereof.

Preferably, said valve and pressure releasing means are slaved to the means connecting said essentially annular element in the contracted or retaining condition thereof, thereby this condition may be eliminated only by a previous complete releasing of the superatmospheric pressure.

According to a preferred embodiment of the pressure cover of the invention, said essentially annular element is advantageously obtained as a metallic rod ring, for example of stainless steel, the outline of which presents an interruption at which there are applied the means by which the contracting of said element and fixing thereof in its contracted condition are carried out.

According to a particularly preferred embodiment, the substantially annular configuration of said element is segmented and presents, in the perimetral outline thereof, a plurality of segments, in particular circle arcs, of alternatively large and small radius, the small radius segments circumscribing said inner outline, the development of which may be selectively lesser and respectively larger than the outer outline or projection of the container mouth. The circle arc segments insert in the inside of the downwardly extending rim of the cup-like body of the cover, thereby connecting to this latter and connecting the cover itself in the condition of tightly abutting thereof on the container mouth, as said small radius circle arcs engage the cut away portion under said projection of the container mouth. To this end, said downwardly extending cover rim is provided with a corresponding plurality of elongated openings, individually effective to allow said small radius circle arcs to pass, and perimetrally aligned along a groove formed in said cover rim, and in turn forming a housing or seat for the large radius circle arcs of the annular element.

The aforesaid and other more specific characteristics of the pressure cover according to the invention will become apparent from the following detailed description of a non-limitative and exemplificative embodiment of the cover and some technical solutions of means associated thereto, with reference to the accompanying drawings, where:

FIG. 1 is a fragmentary and structurally simplified view of the outline of the pressure cover associated to the mouth of a container therefor, said component parts being represented by a section through the radial plane 1—1 of FIG. 2;

FIG. 2 is a plan view of the annular element in the contracted condition thereof about the cover and the container (illustrated schematically);

FIG. 3 is a fragmentary view of a detail of a means, as seen from the plane and in the direction III—III of FIG. 2, used in this embodiment for connecting said element in the contracted condition thereof;

FIG. 4 illustrates the article of FIG. 1, the cover being applied, but said annular element being expanded or enlarged in such a way as to remove the connecting between the cover and the container;

FIG. 5 illustrates the cover and container of FIGS. 1 and 4 separated from one another;

FIG. 6 illustrates the annular element of FIG. 2 in the expanding condition thereof to disengage the cover from the container;

FIG. 7 is a section view through the plane VII—VII of FIG. 6 of the article of FIG. 3, the cover being disengaged;

FIG. 8 is a fragmentary view of the edge portion having a pressure cover, as applied and tight connected to the container momentarily associated thereto, said cover being represented in section through the radial plane in part corresponding to the plane indicated by I—I and in part corresponding to the plane indicated by VIII—VIII in FIG. 2;

FIG. 9 is a fragmentary view of the article of FIG. 8 in a superpressure releasing condition;

Figure 10:
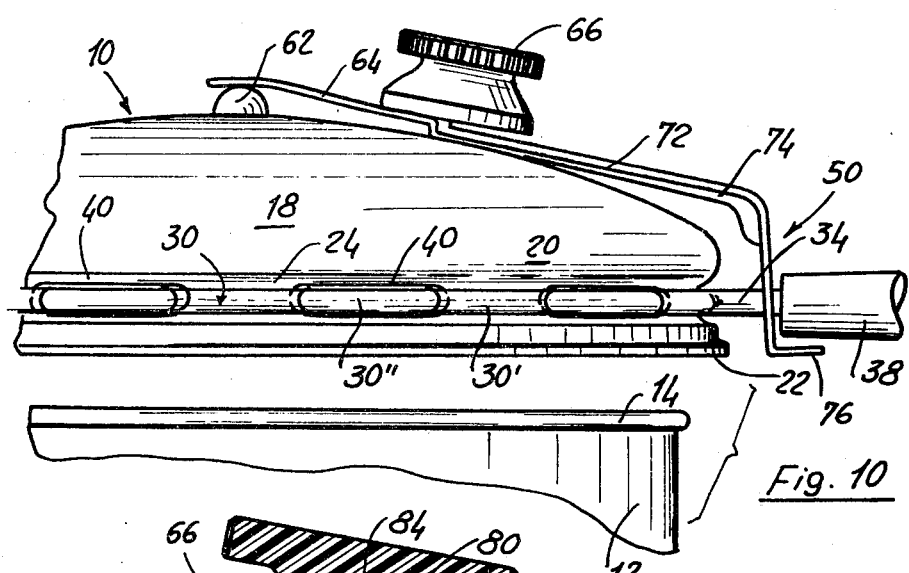
Figure 11:
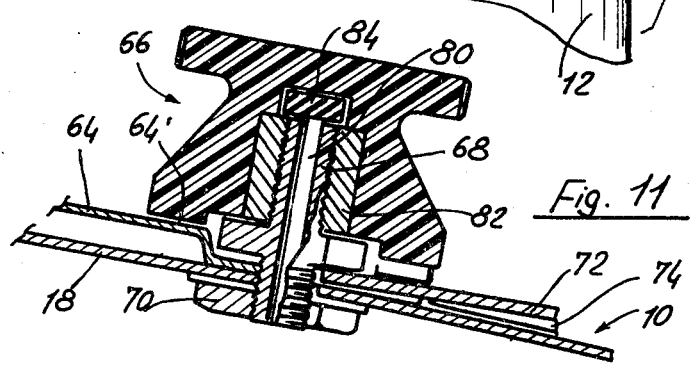

FIG. 10 is a side view of that same cover in a disengaged condition from the container, jointly to a part of the container which is thus separated and FIG. 11 illustrates on an enlarged scale and detail, an exemplificative and not exclusive embodiment of the means for sequentially carrying out the operations for releasing the superpressure and disengaging and opening the cover and respectively the pressure pot momentarily formed and used.

Referring particularly to the drawing figures and at first to FIGS. 1 to 7, the pressure cover according to the present invention, indicated overall by 10 and to be associated to a known type of container, in turn indicated by 12, such as a pot, casserole, pan and the like, effective to provide the containing part of a pressure pot (cooking pot), is of the type comprising, at the mouth thereof, a projecting rim or edge 14, generally but not critically formed by an essentially circular cross-section edge.

The pressure cover is characteristically provided for the applying to a container of the aforesaid type, provided that it is dimensionally and geometrically compatible. Obviously, the pressure cover is produced upon valuating the size and geometrical characteristics of a wide range of containers available on the market and yet distributed to the users, thereby allowing the users of the cover to use known containers and preferably a number of pots, casseroles and the like.

Essentially, the pressure cover comprises means effective to connect under the projection 14 of the mouth of the container 12 in such a way as to form a closure effective to resist against the inner pressure which, as it is known, builds up and maintains during the use of the pressure pot, and under tight condition, for example by interposing an annular gasket 16 between the rim or edge 14 and the inner surface, in particular the outline of the cover.

This gasket may be advantageously of tubular shape and for example formed by a length of a tube made of an elastomeric material such as a natural or synthetic rubber, and closed as to form a loop or ring. Preferably, the deformability and size of this gasket are preselected in such a way that said gasket is able to deform, during the use, not only due to the opposing of the parts therebetween it is clamped, but also by exploiting the superpressure building up in the inside of the pressure pot, thereby improving the tightness and engaging conditions thereof.

This annular gasket 16 may also be of a different type, and for example of U-shaped cross-section, inwardly directed, thereby exploiting said inner pressure to assure the adhesion. However, said gasket has to be able to allow for an initial tightness, due to the adhesion resulting from the resilient deformation thereof, sufficient to form the inner superatmospheric pressure.

The pressure cover comprises a cup-like portion 18, which may be made of metal sheet, in particular stainless steel, having a shaped rim or edge 20 downwardly extending and continued by an extension 22 as far as to reach a level clearly lower than the level of the raised rim 14 of the associated container 12. Said cover rim or edge is moreover provided with a channel or groove 24 (shown in detail in FIGS. 8 and 10) outwardly directed. However, the rim 20-24 of the cover cup-like body is sized in such a way as said cover may be freely inserted about the mouth of the container, passing the perimetral raised edge 14 with said groove 24, a light clearance being allowed for (said clearance being sufficient to compensate for the inevitable size tolerances between containers having nominally the same diameter).

Also characteristically, the pressure cover comprises a discontinuous annular component, indicated overall by 30, effective to be inserted in said groove 24 from the outside, said discontinuity being formed by an interruption (in the perimetral direction), the wideness of said discontinuity being sufficient to allow for a contracting of said annular component thereby obtaining the above described connecting effect. Said annular component 30 is advantageously obtained in the form of a metallic section length, preferably a rod, for example of stainless steel, of other metallic material of such composition and/or characteristics as to be suitable for a kitchen use. Said rod, or the like, is bent as to form a near complete circle, and the ends thereof are associated to parts, preferably bent at 90° and indicated by 32 and 34, preferably provided with handles 36 and 38 respectively, for facilitating the handling and allowing a sufficiently strong action to be manually exercised thereonto to bring the component 30 from the expanded condition thereof (FIG. 6) to the contracted condition (FIG. 2).

Figure 8:
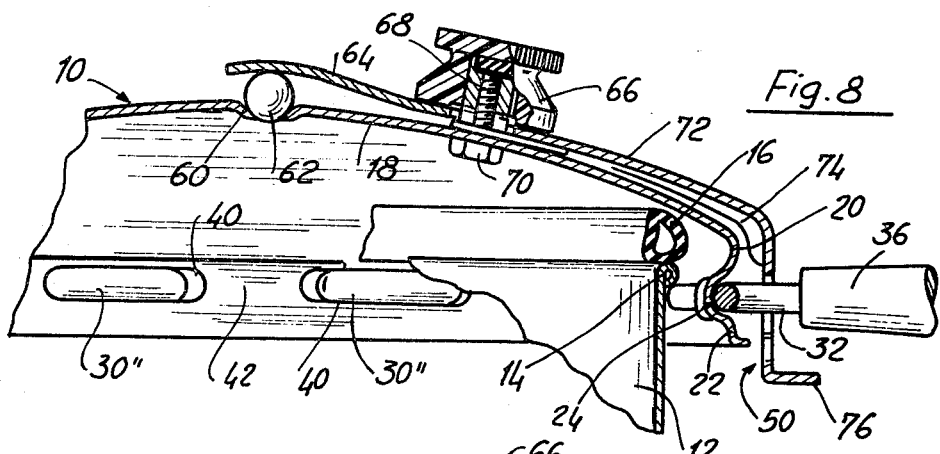
FIGS. 8 to 11 illustrate, in a structurally semplified and size-alterated form, in order to evidentiate the respective operations, exemplificative embodiments of the complementary means provided for obtaining different disengaging effects and a preliminary releasing of the inner superatmospheric pressure and, more precisely.
Figure 9:
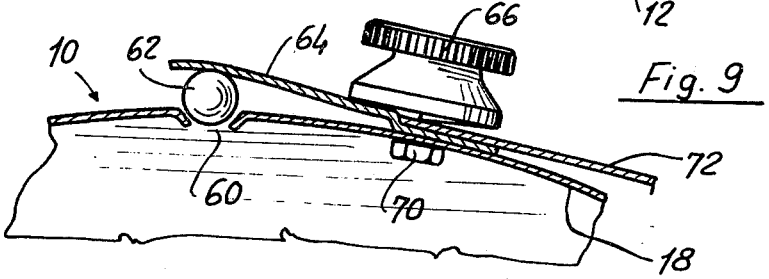

Also characteristically, the near completely circular part of said component 30 is segmented and provided with a sequence of segments or circle arcs (of varying number) alternatively of large and small diameter repeating on the outline of the component, some of which are indicated by 30' and respectively 30". The deformability of the component part 30 and the varying of the gap between the parts 32 and 34 thereof are so designed that the circle circumscribed by the small radius arcs 32" is outwardly located with respect to the rim 14 of the container, as the component is expanded (FIGS. 5, 6 and 10), whereas said circumscribed circle is rather lower than said projection 14 as the component is contracted (FIGS. 1, 2 and 8).

At said groove 24, the downwardly bent edge or rim of the cover cup-like body 18 is provided with a plurality of extended opening 40 separated by portions 42 forming corresponding parts of the groove 24, said openings 40 and portions 42 being opposed to the segments or arcs 32" and 32' of the small and respectively large diameter of the annular component 30.

Therefore said annular component 30 is generally outwardly located from the cover downwardly bent edge or rim, being housed in the related groove 24; however, in the contracted condition of the component (FIGS. 1, 2 and 8) the small diameter segments 30" of said annular component 30 pass through the openings 40 (said segments may also slightly inserted in said openings in such a manner as to slightly project therefrom, as the component is in its expanded condition) thereby engaging under the projection 14 of the container, as the pressure cover is completely fitted, and thus being firmly connected for a mutual abuttingly engaging between said segments 30" and said projection 14.

The round shape of the cross section of said projection 14 and the rod forming preferably the annular component 30, facilitates and integrates the downwardly forcing of the cover as said annular component contracts, thereby assuring the original adhesion or engaging of the gasket between the parts therebetween it is interposed.

The stable and firm connecting of the pressure cover to the underlying container is assured by holding said component in its condition of maximum contracting (see FIG. 2); in turn said retaining or holding effect is assured by suitable means connecting to one another the parts 32 and 34, in a condition of maximum mutual approaching thereby providing for a clamping action.

FIGS. 1, 3, 6 and 7 illustrate, as an example only, the means for providing the aforesaid retaining or holding effect. Said means consist of a metallic perforated plate 50 (which may be formed by a portion of a further component, as it will be described thereinafter), through which said parts 32 and 34 pass, and comprising, from one side, preferably the upper side, an opening 52 sufficiently narrowed (in the annular component perimeter direction) to connect or fix said parts in the flanked position thereof (FIGS. 2 and 3) and at the opposed side, preferably the lower one, said opening including an enlarged portion 54 in which said parts 32 and 34 may reach the spacing requested for widening the annular component 30 and hence for removing the pressure cover, i.e. opening the pressure pot. As particularly shown in FIGS. 3 and 7, the plate 50 comprises notches or recesses, located on the sides of the narrowed part 52 thereof, effective to firmly retain said parts 32 and 34 in the adjacent or flanked position thereof. Therefore the contracting and expanding operations cause said parts 32 and 34 to move from the narrowed space to the enlarged space of the opening of the plate 50, and vice versa.

FIGS. 8 and 11 illustrate, as an example only, complementary means and devices integrating the pressure cover and effective to impart to said cover, or most properly to the pressure pot formed by associating said cover to a container 12, the most suitable safety and service efficience characteristics. In particular these characteristics include the practical impossibility of the removing or loosing of the cover from the pressure tight condition thereof, unless the outer superatmospheric pressure is not preliminary and completely released. In particular, said means are such as to prevent the annular component 30 from disengaging from the contracted condition thereof illustrated in FIGS. 1, 2 and 3, unless at least one passage effective to outwardly release said pressure has been preliminary opened. Said complementary means further include an advantageous and not critical technical solution for forming a safety valve, calibrated in such a manner as to yield, as a predetermined pressure is exceeded, and for operatively associating said safety valve to the cover disengaging means.

According to these examples, the cover cup-like part 18 comprises an opening 60, preferably flared and calibrated, thereinto the valve body is engaged, said valve body being preferably formed by a small ball 62 made of metal, glass, suitably hard elastomeric material or the like, said ball being pushed in said opening by a resilient means, preferably a laminar spring 64.

Said elastic or resilient means 64 is held in the use position thereof by means of an operating member, such as a knob 66, screwing on a threaded pin 68, made rigid at 70, for example by means of a nut, to the part 18 of the cover. By unthreading said knob (which may act against the end portion 64' of the laminar spring 64, by means of a helical slanted plane) it is possible to obtain a releasing of the pressure applied to the valve body 62, by rotating, for a portion of a revolution, said knob 66.

As the knob 66 is thightened, it also locks at a lower position an arm 72 extending as far as and beyond the cover rim or edge, said arm being preferably stiffened for example by one or more ribs 74 and bending downwardly along the cover edge thereby forming, by the end portion thereof, said plate 50.

Therefore by tightening the knob 66 two effects are obtained: (a) the loading of the spring 64 (which load may be varied by rotating said knob) and hence the operating of the safety valve, and (b) the locking of the plate 50 at the lowered position thereof (with respect to the parts 32 and 34 of FIGS. 1, 3 and 8) with a consequent complete preventing of the expansion of the annular component 30.

On the contrary, the unthreading of the knob 66 causes the spring 64 to release, preferably sequentially, with a consequent releasing of the inner pressure, and then the arm 72 (which preferably comprises and end bend 76 for handling) disengages from the lowered position thereof shown in FIG. 8 thereby allowing the operator to rise said arm to the position thereof illustrated in FIG. 10 with a consequent moving of the plate 50 to the position of FIG. 7, with respect to the parts 32 and 34 which therefore may be spaced to widen the annular component 30 and completely open the pressure pot.

FIG. 11 illustrates a detail of a further safety means. Through the threaded pin 68 an axial hole 80 is formed, said pin being housed (preferably by engaging with a threaded bush 82 embedded in the knob body, and preferably of a thermo-insulating material) in a blind hole in the inside of said knob, and at the bottom of which a small disc 84, or the like, for example made of rubber is located which, as the knob is completely tightened, abuts in a tight way the inner end of the hole 80 thereby allowing for a tight closure of the pressure pot. Accordingly by unthreading said knob, the inner pressure is caused to release also through said hole 80 and then said pressure "discharges" to the outside along said threaded part, prior to the widening of the annular component by the system formed by the arm 72 and plate 50.

It should be apparent that some of the different technical solutions which have been described and illustrated, relating to the pressure cover overall and/or the several means and devices integrating said cover, will be able of a number of modifications and variations, depending on the making needs and the applying to different types of containers, without departing from the scope of the invention as defined in the following

I claim:

1. A cover effective to be applied to pots, casseroles and like kitchen containers, of such size and structural characteristics as to allow for a use thereof as the "container" part of a "pressure pot" and comprising an outwardly projecting rim or edge at the mouth thereof, characterized in that it is formed by a structural component (generally made of metal and of cup-like shape) comprising a downwardly directed bent rim, of such a size as to be fitted with a reduced clearance about said container projecting rim, and in that it comprises an essentially annular component, located about said rim and effective to contract or shrink, from a condition of free passing about the projection of the container mouth, to a condition in which at least a part of the structure fitted about the rim of container engages abuttingly said projection, said cover further including means effective to provide for tightness, safety and shrinking of said annular component, the applying of said cover to said container and the abuttingly fixing of the cover to the rim of the container allowing for an efficient pressure pot to be obtained.

2. A pressure cover according to claim 1, characterized in that said annular component has a segmented perimetral outline, including small and great diameter parts, said small diameter parts circumscribing, as the component is in the contracted condition thereof, a circle having a diameter lesser than that defined by the projecting of said rim of the container mouth.

3. A pressure cover according to claim 1, characterized in that said essentially annular component forms, through the greater part of the perimetral outline thereof, a resiliently shrinkable circle, said circle being interrupted, and in that said component is provided, at either side of said interruption, with radially directed parts associated to handling and holding means effective to cause said component to contract or shrink and respectively to fix said component in the contracted or shrinked condition thereof.

4. A pressure cover according to claim 3, characterized in that said holding means comprise an element effective to hold flanked or adjacent said parts deliminating said interruption, said handling means comprising means effective to release or disengage said holding means and to allow said annular component to expand to the condition of free passing beyond the projection of the container mouth.

5. A pressure cover according to claim 2, characterized in that the downwardly directed rim of the structural component thereof comprises a plurality of elongated and perimetrally aligned openings, at a level underlying the container cover-fitting mouth, the small diameter parts of said annular component being able to insert in said openings, as said component shrinks, or contracts, in such a way as to abuttingly engage said container projection.

6. A pressure cover according to claim 5, characterized in that said downwardly directed rim comprises an outwardly directed perimetral groove along which said openings are formed, said groove forming a housing for said annular component.

7. A pressure cover according to the preceding claim, characterized in that said holding means comprise a part forming a plate provided with an opening through which the radially projecting parts of the essentially annular component pass, said opening including a narrowed portion and an enlarged portion effective to hold said parts at a flanked and respectively enlarged position.

8. A pressure cover according to claim 7, characterized in that said plate part is associated to a movable arm, the moving of which being effective to widen said annular component and slaved to the opening of a passage for releasing the inner pressure of the pressure pot.

9. A pressure cover according to claim 8, characterized in that said passage includes a safety valve, the loading of said valve being effective to be reduced and removed.

* * * * *